United States Patent [19]
Henault

[11] 3,733,829
[45] May 22, 1973

[54] DEPOLLUTION GASES

[75] Inventor: Claude Henault, Chevilly-Larue, France

[73] Assignee: Regie Nationale des Usines Renault et Societe Dite des Automobiles Peugeot, Paris, France

[22] Filed: Oct. 5, 1972

[21] Appl. No.: 295,357

[30] Foreign Application Priority Data

Dec. 28, 1971  France..............................7146986

[52] U.S. Cl......................60/289, 60/301, 23/288 F
[51] Int. Cl..............................................F02b 75/10
[58] Field of Search........................60/289, 290, 301, 60/284; 23/288 F; 423/213, 214

[56] References Cited

UNITED STATES PATENTS

| | | | |
|---|---|---|---|
| 1,902,160 | 3/1933 | Frazer | 60/301 |
| 3,072,457 | 1/1963 | Bloch | 60/301 |
| 3,186,806 | 6/1965 | Stiles | 60/295 |
| 3,228,746 | 1/1966 | Howk | 60/301 |
| 3,662,540 | 5/1972 | Murphey | 60/274 |

*Primary Examiner*—Douglas Hart
*Attorney*—Norman F. Oblon et al.

[57] ABSTRACT

An apparatus for supplying air to a catalytic, oxidizing-reducing reactor for the exhaust gases from an internal combustion engine. An air pump with an output rate at least twice that required for complete combustion of carbon monoxide delivers an amount of air to a pair of catalytic beds which are adjusted from common thermostatically and discontinuously controlled distribution means determined by the catalytic bed temperatures, such that the reducing bed initially functions as an oxidizer and the oxidizing bed is cooled by excess air the moment a critical temperature is reached.

4 Claims, 1 Drawing Figure

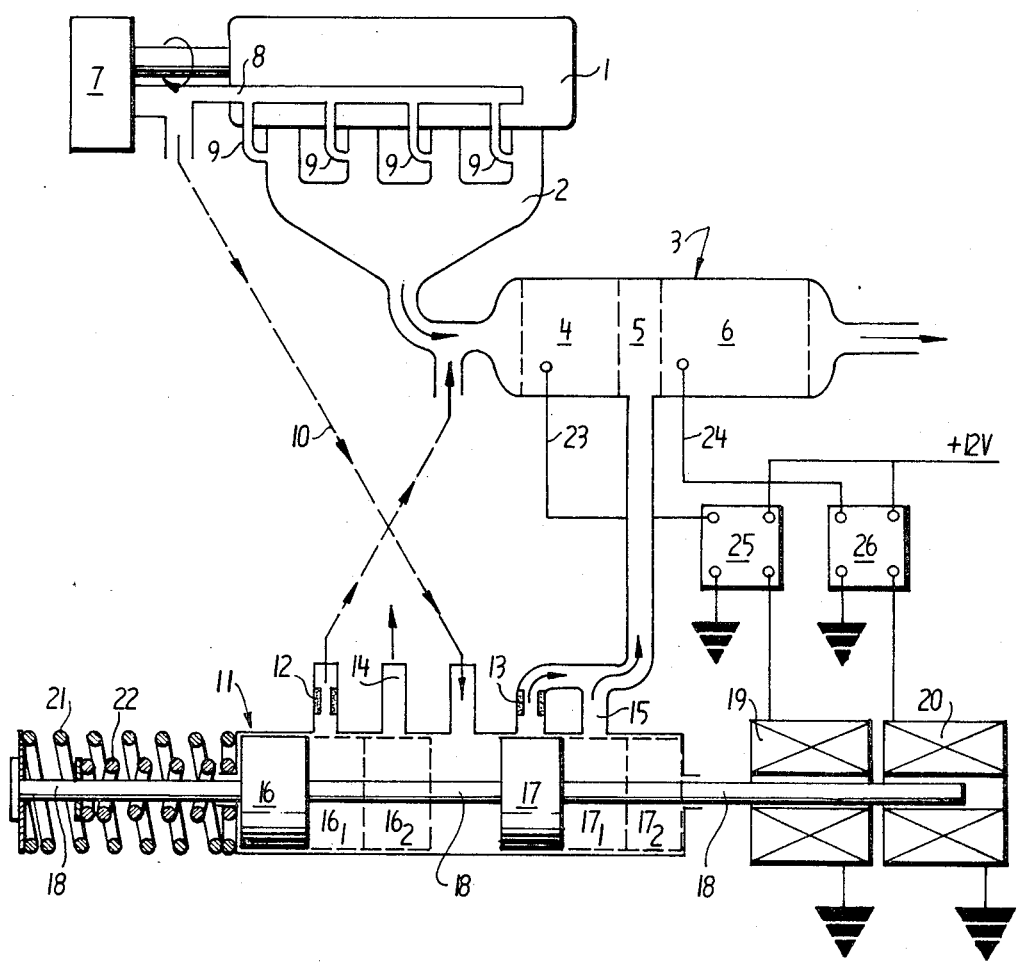

DEPOLLUTION GASES

BACKGROUND OF THE INVENTION

1. Field Of The Invention

The present invention relates generally to a pollution-control device for internal combustion engine exhaust gases operating catalytically, and more particularly to regulating the operation of a catalytic reactor, oxidizing carbon monoxide and hydrocarbons and reducing the nitrogen oxides.

2. Description Of The Prior Art

It is known that while the catalyst's reducing endothermic reaction limits the dangers of catalyst destruction due to over-heating, the exothermic reducing reaction onthe other rapidly raises the catalyst to the limiting temperature for certain richness ratios of the combustion mixture for engine full-load.

Devices for limiting such excess temperature rises are known, such for instance as those which deviate the gas jets of the exhausts through a catalyst by-pass and thus shield the catalyst from over-heating, but such devices reduce the ability of pollution-control.

Cooling devices for oxidizing catalysts also are known, in which cold air is passed through the catalyst, increasing the flow rate as a function of temperature, such that the temperature remains below the critical limit. Such solutions however are little compatible with reactor operation when nitrogen oxides are to be reduced, because of the excess of air and because endothermic reaction does not require cooling, but rather initial heating to start the process.

SUMMARY OF THE INVENTION

It is accordingly an object of the present invention to provide an efficient and economical device for regulating the operation of a catalytic reactor.

A further object of the present invention is to provide a device for regulating the operation of a catalytic reactor so as to reduce the nitrogen oxides and oxidizing carbon monoxide and hydrocarbons.

A still further object of the present invention is to provide an air supply regulation device for an exhaust gas catalytic reactor which performs the dual function of reducing the nitrogen oxides and oxidizing carbon mon-oxide and hydrocarbons in a double catalytic bed without running the risk of over-heating the oxidizer or un-priming the reducer.

Briefly, in accordance with one embodiment of the present invention, these and other objects are attained by providing a catalytic reactor constituted of two compartments holding the catalytic beds, assembled in series and separated by a decompression space for the gases. The first compartment is located upstream in the flow direction of the gases and contains the reducing bed which is of the lesser amount of catalyst, the second constituting the oxidizing reactor. Each of the reactors is provided with a temperature probe and with an air supply at the input. An air supply is also provided at each inlet to the exhaust tubing, namely at each cylinder's exhaust. The pollution-control device operating by air-supply control of the dual catalytic reactor as discussed above and based on an air pump of a type known per se, and driven by the engine, is thus characterized that the pump operates continuously from the exhaust of all cylinders and delivers such quantities of air by means of calibrated tubes that the stoichiometric mixture proportions will not be met for oxidizing carbon monoxides or the hydrocarbons, and using thermostatically controlled distribution means in the form of catalytic bed temperature probes, ensuring:

a. an initial supplementary and minor air supply at the inlet to the reducing bed, causing its start as an oxidizing bed up to the shutting of the said supplementary supply when the operational temperature of the reducing bed has been achieved;

b. simultaneously opening an air supply of the same flow rate at the inlet to the oxidizing bed and, c. adding to the air supply an additional cooling supply of high flow rate the moment the oxidizing bed temperature reaches a certain threshold.

In order to ensure the various air supplies, the air pump has an output at least twice that required for total combustion of the engine carbon monoxide. During phases (a) and (b) above, which correspond to starting and low level operation, the excess air is expelled to ambient by the distribution organ exhaust which is closed during phase (c), when the oxidizing bed is being cooled.

The control device for the air supply of the dual catalytic reactor therefore ensures that there be complete regulation of such reactors, that is, a rapid starting of the reducing bed because of initial heating as the oxidizing bed and protection against the oxidizing bed over-heating, such modes being achieved by combining means such as those in the illustrated embodiment of the device according to the specifications below and as shown in the attached drawing.

BRIEF DESCRIPTION OF THE DRAWINGS

The FIGURE is a schematic view of the dual catalytic reactor and control system of the present invention.

DESCRIPTION OF A PREFERRED EMBODIMENT

Referring now to the drawing wherein there is shown an engine 1 with its exhaust manifold 2 leading into a catalytic reactor 3 including a reducing catalytic bed 4, an intermediate chamber for a mixture of gas and air 5 and an oxidizing catalytic bed 6. The catalytic beds 4 and 6 may be formed from the same catalyst.

An air pump 7 with an output at least twice that required for total combustion of the engine carbon monoxide issuing from engine 1 in normal operation is driven by latter, delivers into a conduit 8 feeding the exhaust holes of each cylinder of engine 1 by means of calibrated tubes 9, and also delivers into a conduit 10 for feeding a distribution valve 11 with four calibrated outlets. Two of the outlets 12 and 13 are low-volume outlets connected respectively to the inlets of the catalytic beds 4 and 6, one of the outlets 14 is to atmosphere and one large flow rate outlet 15 is connected to inlet 5 of catalytic bed 6.

Distribution is achieved by means of two pistons 16 and 17 which are mounted on a common stem 18 which is controlled by two electromagnets 19 and 20 and positioned in the start and stop positions by two concentric springs 21 and 22.

Temperature probes 23 and 24 are each placed in the catalytic beds 4 and 6 respectively and they feed thermostatic relays 25 and 26 respectively controlling the electromagnet coils 19 and 20.

When there is no electromagnetic action (19,20), spring 21 will maintain pistons 16 and 17 in the position shown in the figure for the stopped and starting positions and in operation.

Pump 7 will therefore deliver via the tubes 9 and outlet 12 a quantity of air slightly larger than that necessary for stoichiometric combustion conditions in catalytic bed 4, the latter being upstream and of lesser mass then bed and thus causing bed 4 to rise in temperature and starting rapidly as an oxidizing bed, when in the starting condition.

The moment the bed 4 temperature reaches a certain predetermined level, the thermometric probe 23 will actuate coil 19 via relay 25, and actuation of stem 18 brings pistons 16 and 17 into positions $16_1$ and $17_1$, spring 21 being compressed, and resting against spring 22. This displacement shuts outlet 12 and opens outlet 13, so that the air flow input is decreased causing bed 4 to operate as a reducer from that point; that is, rapidly after the starting phase, a dually acting oxidizing-reducing catalytic reactor will have been obtained.

At higher operational levels, where heating of the oxidizing bed might be dangerous to the catalyst, temperature probe 24 in turn will actuate the thermostatic relay 26 and coil 20 when a predetermined threshold has been reached causing pistons 16 and 17 to move to positions $16_2$ and $17_2$ pushing against springs 22 and 21.

Responsive to repositioning of pistons 16 and 17 the atmospheric outlet 14 is closed and the high-flow rate outlet 15 is opened towards catalytic bed 6. The excess air flow from pump 7 is then used to cool bed 6.

Thus, by means of simple thermostatically controlled devices regulating the air flow, one may achieve satisfactory operation of the catalytic reactor for the various modes, and reliability and ruggedness is obtained by eliminating regulation of the exhaust gases proper.

Obviously, numerous modifications and variations of the present invention are possible in the light of the above teachings. It is therefore to be understood that within the scope of the appended claims the invention may be practiced otherwise than as specifically described therein.

What is claimed as new and desired to be secured by letters patent of the United States is:

1. A control device for a dual bed catalytic reactor capable of reducing pollutants from exhaust gases, comprising:
    means for supplying air to said reactor in an amount at least twice that necessary for complete combustion of carbon monoxide;
    means for sensing the temperature of each bed of said dual bed catalytic reactor;
    a conduit for introducing air continuously to an exhaust manifold in an amount slightly less than that necessary for stoichiometric combustion conditions; and,
    means for distributing the air from said air supplying means, said distributing means including at least four outlets of which only two are open at a given time, two of said outlets being capable of respectively feeding air in a limited capacity to one or the other of said catalytic beds, one of said outlets being capable of exhaust to atmosphere, and one of said outlets being capable of high-flow output of air for feeding the inlet of one of said catalytic beds.

2. A control device as set forth in claim 1 wherein during the starting phases of said reactor only the atmospheric outlet and one of said outlets capable of feeding air in a limited capacity are in the open position such that starting and temperature rise occurs during oxidation.

3. A control device as set forth in claim 1 wherein said catalytic beds are in series and wherein a sensed predetermined temperature upstream of the first bed will trigger the closing of supplementary air flow to the upstream catalytic bed and opening of the limited-flow outlet to the downstream catalytic bed.

4. A control device as set forth in claim 3 wherein a sensed predetermined temperature in the downstream oxidizing catalytic bed will trigger the closing of the atmospheric outlet and opening of the high-flow outlet to the downstream oxidizing catalytic bed.

* * * * *